(12) United States Patent
Edwards et al.

(10) Patent No.: US 9,784,401 B1
(45) Date of Patent: Oct. 10, 2017

(54) CONDUIT REPAIR

(71) Applicants: Matthew S. Edwards, Austin, TX (US); Peter J. E. Edwards, Galveston, TX (US)

(72) Inventors: Matthew S. Edwards, Austin, TX (US); Peter J. E. Edwards, Galveston, TX (US)

( * ) Notice: Subject to any disclaimer, the term of this patent is extended or adjusted under 35 U.S.C. 154(b) by 117 days.

(21) Appl. No.: 14/756,493

(22) Filed: Sep. 11, 2015

(51) Int. Cl.
*F16L 55/17* (2006.01)
*F16L 55/18* (2006.01)

(52) U.S. Cl.
CPC .......... *F16L 55/1715* (2013.01); *F16L 55/18* (2013.01)

(58) Field of Classification Search
CPC ..... F16L 155/175; F16L 155/18; F16L 33/12; B60P 7/083; B60P 7/08; Y10T 24/1604; Y10T 24/1628; Y10T 24/2117; Y10T 24/2102; Y10T 24/2147; Y10T 24/3409; Y10T 24/2113; Y10T 24/2128; Y10T 24/2143; Y10T 24/2185; Y10T 24/1412; Y10T 24/1416; Y10T 24/142; Y10T 24/1422
USPC ............ 138/99, 97, 110, 158; 285/420, 252; 292/262, 288, 256
See application file for complete search history.

(56) References Cited

U.S. PATENT DOCUMENTS

| | | | | |
|---|---|---|---|---|
| 4,381,020 A * | 4/1983 | Daghe | ................... | F16L 21/005 138/99 |
| 4,391,300 A * | 7/1983 | Saylor | ................... | F16L 55/172 138/99 |
| 4,889,167 A * | 12/1989 | Morris | ................... | F16L 55/172 138/110 |
| 4,969,923 A * | 11/1990 | Reeder | ................... | F16L 23/06 24/270 |
| 5,002,093 A * | 3/1991 | Connolly, Jr. | .......... | F16L 55/17 138/97 |
| 5,247,967 A * | 9/1993 | Bourque | ................. | F16L 55/16 138/97 |
| 5,706,862 A * | 1/1998 | Meinerding, Sr. | ....... | F16L 33/02 138/98 |
| 6,296,021 B1 * | 10/2001 | Lew | .................... | F16L 55/1683 138/98 |
| 6,588,070 B2 * | 7/2003 | Tran | ...................... | F16L 55/172 24/279 |
| 6,898,825 B1 * | 5/2005 | Charest | ................. | F16L 33/035 24/16 PB |
| 7,232,160 B2 * | 6/2007 | Krausz | .................. | F16L 55/172 285/15 |

(Continued)

*Primary Examiner* — Craig Schneider
*Assistant Examiner* — David Deal
(74) *Attorney, Agent, or Firm* — Chris Whewell

(57) ABSTRACT

Provided are articles useful for rapidly and easily stopping leaks of material contained in conduits, such as water pipes under pressure. Articles according to this disclosure include a band, a lock and a lever. The band is wrapped around the conduit or pipe, and the lever is configured to engage with an end of the band and the lock that rides on the band. Manually, pulling the remaining end of the band and then actuating the lever, or vice versa, cinches the band around the outer circumference of the conduit, effectively sealing the conduit wall and preventing the contents of the conduit from leaking into the ambient surroundings. Elements of the invention cooperate to permit easy removal of the articles for re-use.

9 Claims, 10 Drawing Sheets

(56) References Cited

U.S. PATENT DOCUMENTS

| | | | | |
|---|---|---|---|---|
| 7,497,489 B2 * | 3/2009 | Baughman | ............ | B65D 45/345 |
| | | | | 292/256.65 |
| 9,206,935 B2 * | 12/2015 | Senter, Jr. | ............ | F16L 55/1715 |
| 2012/0216901 A1 * | 8/2012 | Dickinson | ............ | F16L 55/1715 |
| | | | | 138/99 |

* cited by examiner

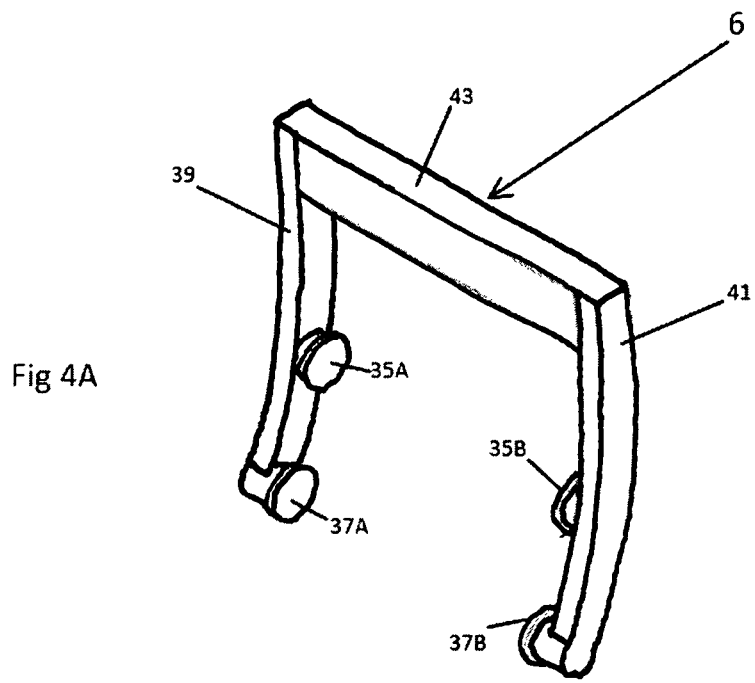
Fig 4A
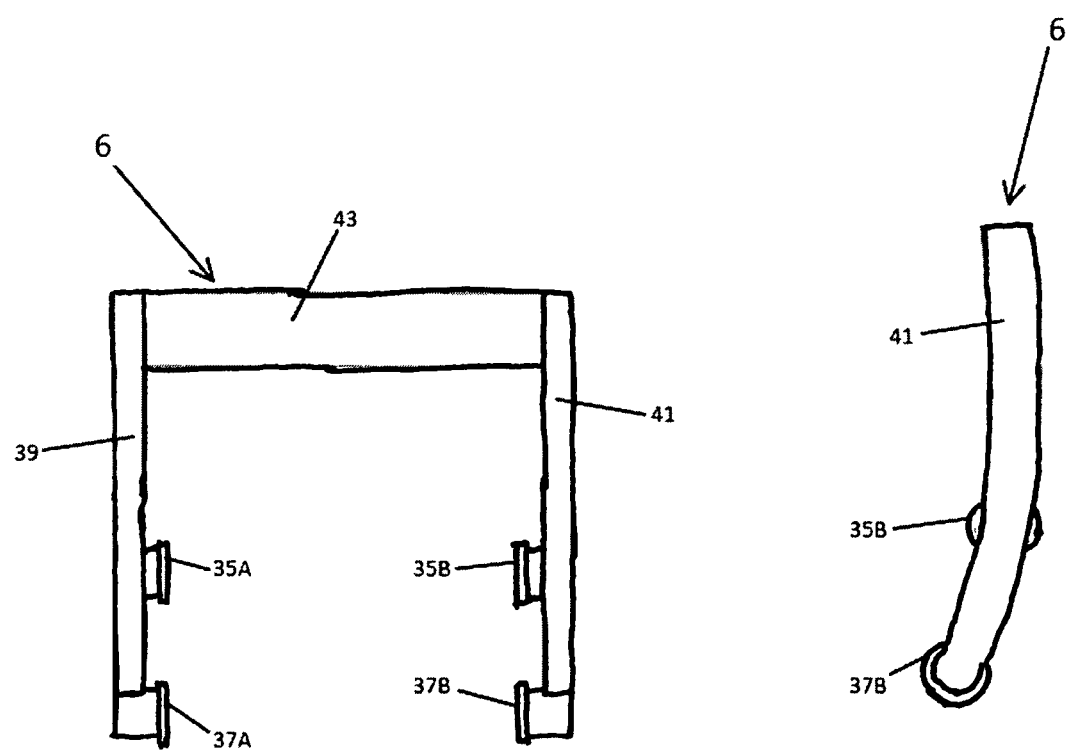
Fig 4B
Fig 4C

CONDUIT REPAIR

TECHNICAL FIELD

This invention relates generally to repairing defects in conduits, pipelines and the like. More particularly, it relates to a removable, re-usable article that is useful for quelling leaks and other defects in or on the wall of a conduit that otherwise permits leakage or escape of a material present within the conduit, to the ambient surroundings.

BACKGROUND OF THE INVENTION

The statements in this background section merely provide background information related to the present disclosure and may not constitute prior art.

Conduits useful for enabling conveyance of fluid substances from one location to another have been known since at least the times of ancient Rome. Presently, the most common type of conduits exist in tubular form and include without limitation liquid pipes and gas pipes. Other examples of conduits include water pipes, oil pipelines, fuel conduit lines in motorized vehicles equipped with either a spark-ignition or compression-ignition engine, refrigeration conduit lines for conveying refrigerants including halogenated hydrocarbons to and from a compressor, pressure-monitoring conduit lines equipped with a gauge, and various conduits present in chemical manufacturing plants for various purposes, all well-known by those of ordinary skill in the art chemical engineering.

Conduits which are pipes are typically shaped to exist as a hollow cylindrical shell, having a length dimension that is orders of magnitude greater than the diameter of the conduit, and having a wall with a selected thickness. Conduits are made from a wide variety of materials depending on their intended end use, as is well-known in the art, typical examples including without limitation thermoplastics including polyolefin polymers and copolymers such as PVC or CPVC, various grades of stainless steel, copper, steel, concrete, asphaltic materials, ceramics, and reinforced composites.

Owing to various reasons which often include physical damage such as being accidentally drilled into and other like damage, it sometimes occurs that the wall of a conduit exhibits a flaw, which can be development of a hole, crack, or other fracture or imperfection that enables leakage from a material present inside the wall of the conduit, to the external surroundings, which leakage is promoted depending on the degree of pressure differential existing between the interior of the conduit and the external surroundings. In some instances such leaks are of little consequence, where in other instances such as when the conduit is transmitting a flammable substance or even water, substantial damage can be caused to occur to articles, equipment, and other physical objects in the vicinity of the leakage.

Rectification of a flaw in a conduit, when the contents of the conduit are under a pressure greater than ambient, typically requires the pressure inside the conduit be decreased to ambient, the contents internal to the conduit being drained, and replacement or repair is undertaken, as is known in the art.

The present invention provides articles that are readily affixable to the exterior of a conduit, to quickly stop a material inside a conduit from leaking out into the external surroundings. The articles provided herein are easy to use, rapidly deployed, readily removable, reusable and prevent property damage when used as taught herein.

SUMMARY OF THE INVENTION

The present invention provides articles useful for sealing leaks present on the walls of tubular conduits. An article provided herein comprises a flexible band having a first end, a second end, a first surface, and a second surface. The first surface has a plurality of distinct depressions thereon, and the second end comprises a first plurality of elongate slots. There is a ratchet lock having an opening passing through it, and the ratchet lock is configured to receive the first end of the band. The ratchet lock further comprises a second plurality of elongate slots, and at least one ratchet tooth configured to engage with the distinct depressions on the first surface of the band so as to permit movement of the band within the opening in one direction only. In deployment of an article of the disclosure, the ratchet lock is disposed about the band by virtue of the band passing through the opening in the lock. There is a lever having a first member, a second member, and a crossmember. The first and the second members each have a proximal end and a distal end, and the first and the second members are each attached to the cross member at their proximal ends. There are a pair of tangs disposed on each of the first member and the second member, one tang of each pair being more distally disposed with respect to the crossmember than the remaining tang of each pair. The remaining tangs of each pair can be termed proximal tangs, and the distal tangs of each of the first and second members are engaged with the first plurality of elongate slots at the second end of the band, and the proximal tangs of each of the first and second members are engaged with the second plurality of elongate slots present on the lock.

BRIEF DESCRIPTION OF THE DRAWINGS

The drawings shown and described herein are provided for illustration purposes only and are merely exemplary of different embodiments provided herein, not intended to be construed in any delimitive fashion.

FIG. 4A is a perspective view of a lever element useful in providing an article according to some embodiments of the disclosure;

FIG. 4B is a front view of a lever element useful in providing an article according to some embodiments of the disclosure;

FIG. 4C is a side view of a lever element useful in providing an article according to some embodiments of the disclosure;

DETAILED DESCRIPTION

Figure 1:
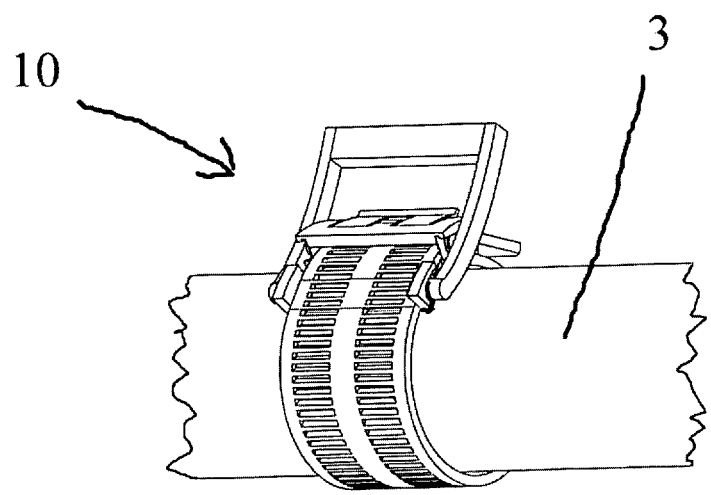
FIG. 1 is a perspective view of a conduit having an article provided herein affixed thereto, in accordance with some embodiments of the disclosure.

Features and advantages of elements, examples and embodiments of the present disclosure will become apparent from this detailed description and drawings, in which like reference numerals correspond to similar, although for all embodiments not always necessarily identical, components or elements. Reference numerals or features concerning an element, subcombination or article having a previously-described function or feature may or may not be described in connection with other drawings in which they appear. Examples in the following description are merely exemplary in nature and should not be construed as being delimitive of the present disclosure, application, or uses.

Referring now to the drawings, and initially to FIG. 1, there is shown a perspective view of a section of a conduit 3 having an article 10 provided hereby affixed thereto. In this embodiment, conduit 3 is a section of a pipe through which water flows under pressure, and which has sprung a leak due to age, fatigue or any other cause. Affixing article 10 to the exterior surface of conduit 3 according to this disclosure, stops the leak.

Figure 2:
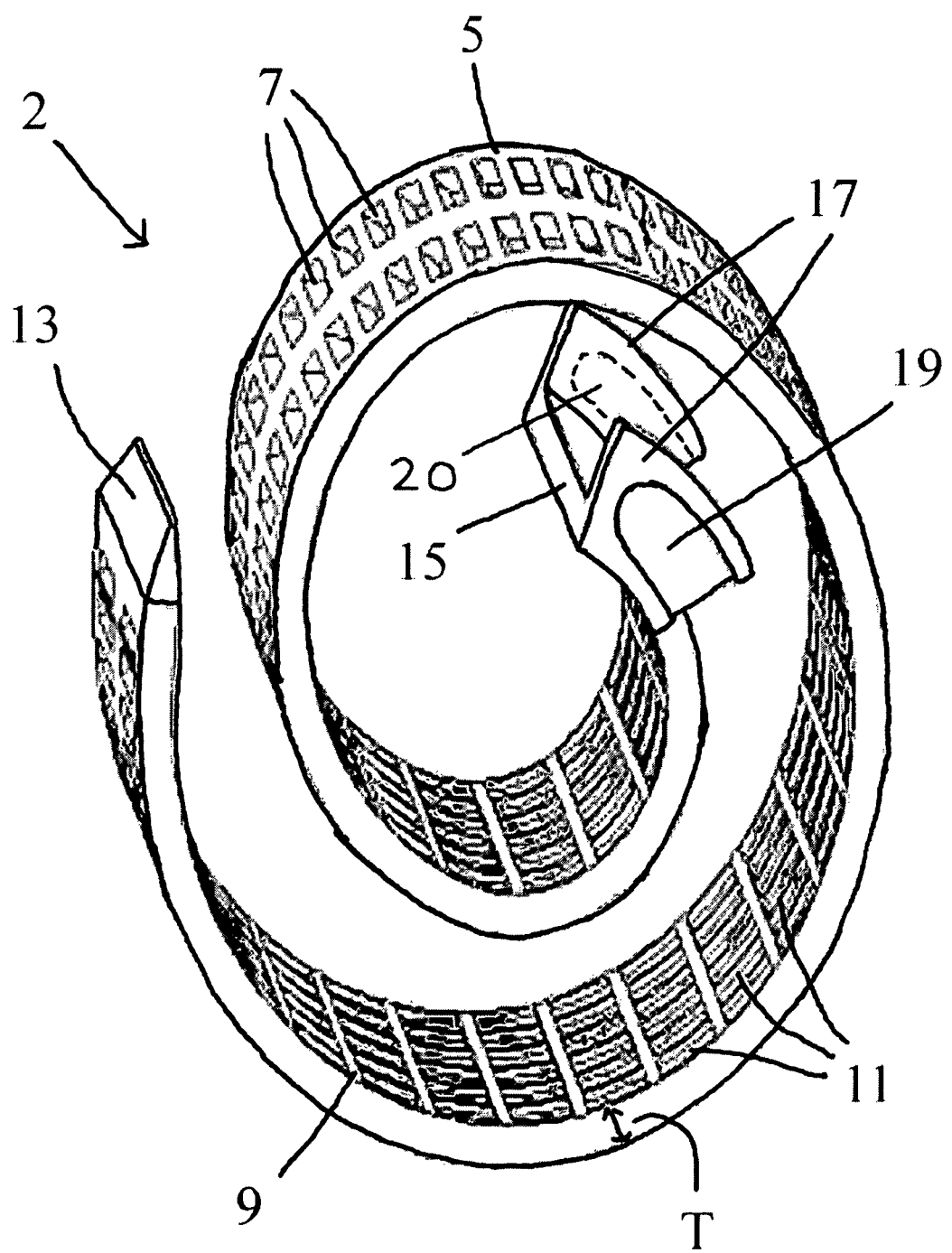
FIG. 2 is a perspective view of a band useful in providing an article according to some embodiments of the disclosure.

In FIG. 2 is shown a perspective view of a band 2 useful in providing an article according to various embodiments of the disclosure. Band 2 is made from any suitable flexible material selected, and has an outer surface 5 and inner surface 9, each of which are present along substantially all of the length of band 2. For purposes of this disclosure and the claims appended hereto, outer surface 5 may be referred to as a first surface and inner surface 9 may be referred to as a second surface. Band 2 has a thickness dimension T, that can be any thickness pre-selected by engineers but for most smaller applications such as repairing leaks in pipes having a diameter in the range between ten millimeters to one-hundred millimeters, thickness T is any thickness in the range of between one millimeter and five millimeters, including all thicknesses and ranges of thicknesses therebetween. However, any suitable thickness can be selected for an intended end-use of an article 10 of this disclosure, greater than five millimeters and up to five-hundred millimeters thick (including all thicknesses and ranges of thicknesses therebetween), or thicker, for instances an article 10 according to this disclosure is to be employed for stopping leaks on large oil pipelines, conduits aboard seagoing vessels containing steam, or other relatively large-conduits.

Band 2 has a first end 13, which in some embodiments is tapered substantially to a point as shown in FIG. 2. In other embodiments, first end 13 is blunt. First end 13 can also be tapered or have any side profile selected, provided it is insertable into the opening 25 on ratchet lock 4 of FIGS. 3A-3E as shown and described elsewhere herein.

Inner surface 9 of band 2 in some embodiments has inner surface feature(s) 11, which can comprise recesses, depressions or any other surface irregularity(ies) arranged in a regular array, or any selected irregular array, for purposes of providing a good grip to the exterior surface of a conduit such as 3 to which article 10 is affixed in use, analogously to how an automobile tire grips the road by virtue of its tread pattern. Inner surface features 11 also provide a clamping/sealing effect that also reduces the surface area, thereby reducing the pressure required to overcome the interior pressure of conduit 3. In some embodiments, inner surface 9 (second surface) with feature(s) 11 of band 2 is lined or provided with a strip of gasket material (88, FIGS. 13A, 13B) so that the surface which contacts a conduit when article 10 is in use, is a planar or alternatively a substantially planar surface, to provide enhanced sealing of the material inside the conduit from the external surroundings. Towards this end, a strip of any conventional gasket material that spans the length and width of the inner surface 9 of band 2 is suitable, some exemplary gasket materials being selected from the group consisting of: cork, rubber, polyolefin-based elastomers, urethane-based elastomers, or any flexible, non-porous material.

Inner surface features 11, and/or gasket 88 when selected to be present, may in some embodiments only be present or disposed along any per-selected sub-portion of the length of band 2 sufficient for the inner surface features 11 or gasket to carry out its function described herein. In some embodiments, inner surface features 11 comprise holes through band 2, regardless of their shape, i.e., when holes they can be shaped as circular, rectangular, ovoid, polygonal, etc. In some embodiments, inner surface features 11, when holes, are complementary to a ratchet tooth or teeth 27 in embodiments when a plurality of ratchet teeth are selected to be present, sufficiently to enable a ratchet tooth 27 to engage with inner surface feature 11 to effectively only permit one-way movement of band 2 through lock 4. In some embodiments, inner surface features 11 are present as holes but to not correspond complimentarily in shape with a ratchet tooth 27, which engages outer surface features 7. A ratchet tooth 27 itself can be comprised of more than one tooth, and the words "ratchet tooth" and "ratchet teeth" are collectively herein described by feature 27, whether it is a single ratchet tooth or a plurality of ratchet teeth, as required by the context. The words "distinct depressions" as used herein includes any depression on the outer surface 5 of band 2, regardless of its shape, that is capable of engaging with a ratchet tooth 27 to enable the function herein taught of selectively permitting either uni-directional or bi-directional movement of band 2 within ratchet lock 4. For some embodiments the term "distinct depressions" with reference to band 2, includes holes disposed through band 2 as being considered depressions to the extent the ratchet teeth 27 are configured to engage with the hole profile selected. Between distinct depressions on band 2, there also can be teeth which are defined by the shape of the depressions and vice versa. Such teeth can have any profile selected including without limitation concave walled, convex walled, pointed, saw-tooth, and a square-wave profile. Inner surface features 11 functions in some embodiments to assist the sealing function of a gasket when the interior surface of band 2 is lined with a strip of gasket. In some embodiments, the strip of gasket employed is not flat but has any selected surface texture.

Outer surface 5 of band 2 has outer surface features 7 present thereon along the length of band 2, which in some embodiments are distinct depressions that are shaped or configured to be engaged by one or more than one ratchet teeth 27 present at ratchet lock 4 as described elsewhere herein. Outer surface features 7 are provided to be present in the configuration of one or more rows along the length of band 2 in different embodiments. In some embodiments outer surface features 7 are present in a single row present along the entire length of the outer surface 5 of band 2 and are configured to engage with a single ratchet tooth 27 present at or on ratchet lock 4. In alternate embodiments outer surface features 7 are present in a plurality of rows present along the entire length of the outer surface 5 of band 2 and are configured to engage with a corresponding plurality of ratchet teeth 27 present at or on ratchet lock 4. Included within this plurality are embodiments having two rows, three rows and four rows of outer surface features. As with inner surface 9, whose inner surface features 11, or gasket, or both, when independently selected to be present or not, may in some embodiments only be present along any selected sub-portion of the length of band 2. Outer surface features 7 may in some embodiments only be present or disposed along any selected sub-portion of the length of band 2 sufficient for the outer surface features 7 to carry out their intended function described herein.

Band 2 has a second end 15, at which are disposed slots 19, 20. Slots 19, 20 are each disposed at a different one of opposite edges or width extremities of band 2 and are elongate, having an open end as shown which is configured to receive lower tangs 37A and 37B present on a lever 6 (FIG. 4A) as described elsewhere herein. Each of slots 19, 20 has a closed end that is semi-circular to engage with the circular contour of lower tangs 37A, 37B when tension is put to upper tangs 35A and 35B of lever 6 during application and use of an article 10 of the disclosure. Slots 19, 20 have a depth corresponding to the length of tangs 37A, 37B, and are configured to feature a lip about their contour that is narrower than the wall inside slots 19, 20 beneath said lip, to enable lower tangs 37A and 37B to be slid into and securely reside within slots 19, 20 substantially-free from lateral movement therein. Thus slots 19, 20 enable lower tangs 37A and 37B of lever 6 to become rigidly engaged with the second end 15 of band 2.

Band 2 is comprised of any material that is flexible enough to enable it to be wrapped around a pipe or other conduit selected for repair, while at the same time having enough cohesive strength to maintain its integrity when stretched sufficiently to seal a leak on the conduit. The person of ordinary skill readily recognizes that many well-known materials are suitable from which to fabricate a band 2 according to this disclosure, including without limitation thermoset polymers, thermoplastic polymers, thermoplastic vulcanizates, fiber-reinforced vulcanized rubber, or any other known material recognized by those of ordinary skill in the art after reading this specification.

In some embodiments, the first end 13 and second end 15 of band 2 are both part of the same unitary construct as the remainder of band 2, such as when band 2 is fabricated using any suitable moulding process known to those of ordinary skill in the art. In other embodiments, either or both of the first end 13 and second end 15 of band 2 are separate elements, that are attached to band 2 by conventional techniques, such as but not limited to fasteners, spikes, snaps, any ratcheted clamping mechanism, heating, thermo-forming, and thermowelding.

Figure 3A:
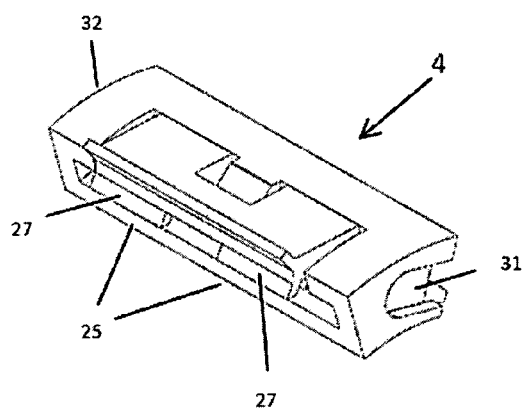
FIG. 3A is an upper perspective view of a ratchet lock element useful in providing an article according to some embodiments of the disclosure.

FIG. 3A is an upper perspective view of a ratchet lock 4 useful in providing an article according to various embodiments of the disclosure. Ratchet lock 4 in some embodiments is shaped as a rectangular solid; however any selected shape for ratchet block 4 is suitable provides it enables the function taught herein. Ratchet lock 4 has an opening 25 that is configured to receive first end 13 of band 2, and opening 25 extends through ratchet lock 4. This enables the entire ratchet lock 4 to be slid along the length of band 2. Provided on ratchet lock 4 is at least one ratchet tooth that engages with outer surface features 7 present on the outer surface 5 of band 2, sufficiently to only enable one-way travel of ratchet lock 4 along band 2, or alternatively, of band 2 through ratchet lock 4. Thus, once first end 13 of band 2 is inserted into opening 25 and band 2 is pulled or pushed further into ratchet lock 4 sufficient to enable an outer surface feature 7 to engage with a ratchet tooth 27, it cannot be pulled back out in the reverse direction due to ratchet tooth 27 being engaged with outer surface feature 7. Band 2 can however be inserted further into ratchet lock 4, analogously to the way in which the common article of manufacture known as a "zip tie" functions.

Ratchet lock 4 further comprises end portions having slots 31, 32 present thereon, whose configuration and function are equivalent to that described for slots 19, 20, inasmuch as they are configured to receive upper tangs 35A and 35B of lever 6 and maintain them securely in position substantially free from lateral movement when tangs 35A and 35B are present in slots 31, 32. In some alternate embodiments, any one or more of slots 19, 20, 31, and 32 are independently selected to not be present.

Figure 3B:
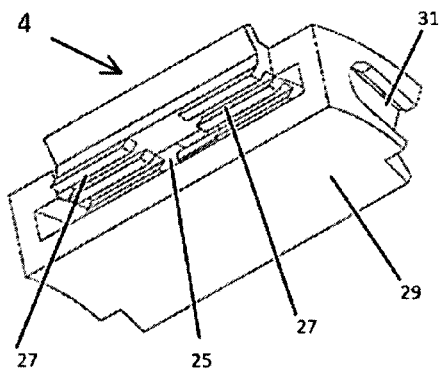
FIG. 3B is a lower perspective view of a ratchet lock element useful in providing an article according to some embodiments of the disclosure.
Figure 3C:
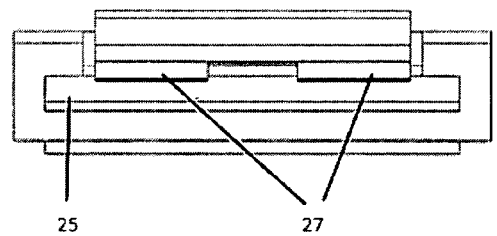
FIG. 3C is a front view of a ratchet lock element useful in providing an article according to some embodiments of the disclosure.
Figure 3E:
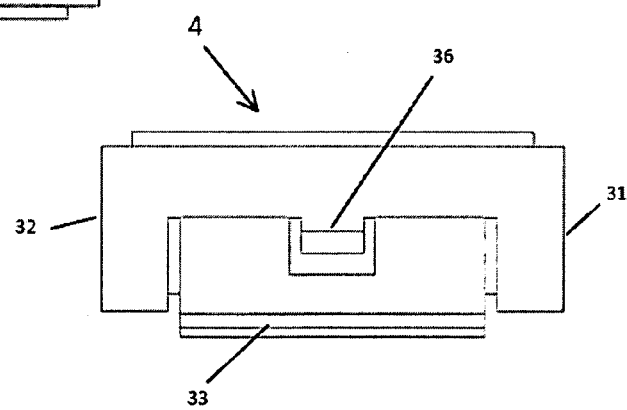
FIG. 3E is an overhead view of a ratchet lock element useful in providing an article according to some embodiments of the disclosure.

FIG. 3B is a lower perspective view of a ratchet lock 4 useful in providing an article according to some embodiments of the disclosure, showing the respective locations of opening 25, a plurality of ratchet teeth 27, bottom 29, and slot 31. Ratchet teeth 27 are shown also in the frontal view of ratchet lock 4 depicted in FIG. 3C.

Figure 3D:
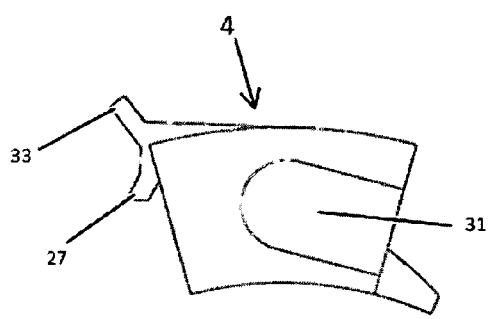
FIG. 3D is a side view of a ratchet lock element useful in providing an article according to some embodiments of the disclosure.

The side view of ratchet lock 4 shown in FIG. 3D depicts the respective locations of slot 31, ratchet tooth 27 and ratchet tooth bar 33. In some embodiments ratchet teeth 27 are present on a bar that spans opening 25, and ratchet teeth 27 are configured to engage with outer surface features 7 of band 2 when band 2 is inserted into opening 25 such that band 2 is capable of moving only in one direction within ratchet lock 4, movement in the other direction being prevented by the presence of one or more ratchet tooth 27. With reference to the overhead view of FIG. 3E, ratchet tooth bar 33 can be mechanically biased manually so as to disengage ratchet teeth 27 from the outer surface features 7 of band 2. In alternate embodiments this is achieved by application of a force on optional release tab 36 when selected to be present, using a fingernail or flat-bladed tool, as release tab 36 is an integral part of ratchet lock 4 as is ratchet tooth bar 33. In such alternate embodiments, these elements are configured so that movement of release tab 36 causes a responsive proportional movement, or temporary mechanical bias of ratchet tooth bar sufficient to enable ratchet teeth 27 to be withdrawn from outer surface features 7 of band 2. In some embodiments, it is ratchet tooth bar 33 itself that is directly moved in order to release ratchet teeth 27 from surface features 7. Thus, in some embodiments at least one ratchet tooth present on lock 4 is attached to lock 4 sufficiently to be selectively manually releasable from a distinct depression or outer surface feature 7 with which the ratchet tooth is engaged. In embodiments having more than one ratchet tooth, the ratchet teeth so present are attached to lock 4 sufficiently to be selectively manually releasable from distinct depressions which they are independently engaged with, the release or disengagement of the plurality of ratchet teeth from the distinct depressions being simultaneously achieved by a single motion of a thumbnail, flat bladed tool, etc. acting on ratchet tooth bar 33.

In FIG. 4A is shown a perspective view of a lever 6 useful in providing an article 10 according to some embodiments of the disclosure. Lever 6 exists generally as a U-shaped bar that is slightly curved as viewed from a side perspective. Lever 6 comprises a first member 39, a second member 41, a crossmember 43. Although exemplified in the drawings as being substantially linear, in alternate embodiments each of said first member 39, second member 41, and crossmember 43 can be non-linear or curved so long as the function of article 10 as a whole as described herein is maintained. In some embodiments is of unitary construction being made from metal, or any metallic alloy including without limitation iron, steel, stainless steel, and aluminum. In some alternate embodiments lever 6 is made from any selected polymer of suitable strength to be of utility as herein described. Those of ordinary skill in the art appreciate the various materials of construction useful for various elements of the present invention which include without limitation metals, metallic alloys, polymers, reinforced composites, etc. known to those skilled in the art.

Figure 6:
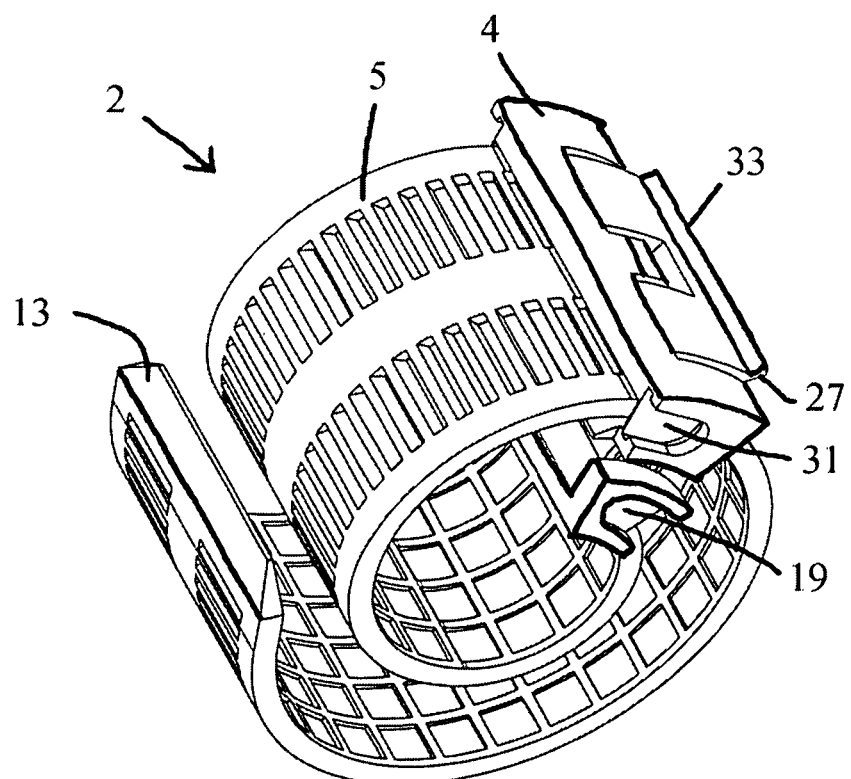
FIG. 6 is a perspective view of a band shown and/or described with reference to FIG. 2 further comprising a ratchet lock element shown and/or described with reference to FIG. 3A disposed on said band according to some embodiments of the disclosure.

Lever 6 features a pair of upper tangs 35A and 35B and a pair of lower tangs 37A and 37B disposed on the interior faces of first member 39 and second member 41, as more clearly seen in FIG. 4B, which is a frontal view of lever 6. FIG. 4C illustrates the slight curvature of lever 6 in some embodiments as viewed from the side, the slight curvature assisting in enabling lever 6 to more securely hold ratchet lock 4 and second end 15 of band 2 when article 10 is put in service. Upper tangs 35A and 35B and lower tangs 37A and 37B are configured to have a body portion which is cylindrical or substantially-cylindrical, and a head portion that is cylindrical with a larger diameter than the body portion and relatively in short length dimension so as to effectively comprise a "head" of the body portion of each of the tangs. Slots 19, 20, 31, 32 are contoured to be complimentary to the outer contours of tangs 35A, 35B, 37A and 37B as illustrated by slot 31 more clearly in FIG. 6. Lever 6 can be U-shaped as shown in exemplary embodiments herein, and in alternate embodiments crossmember 43 can be curved to any degree desired that preserves the function as taught herein, rendering lever 6 to exist in a horseshoe or any other shape as viewed from a frontal perspective.

Figure 5:
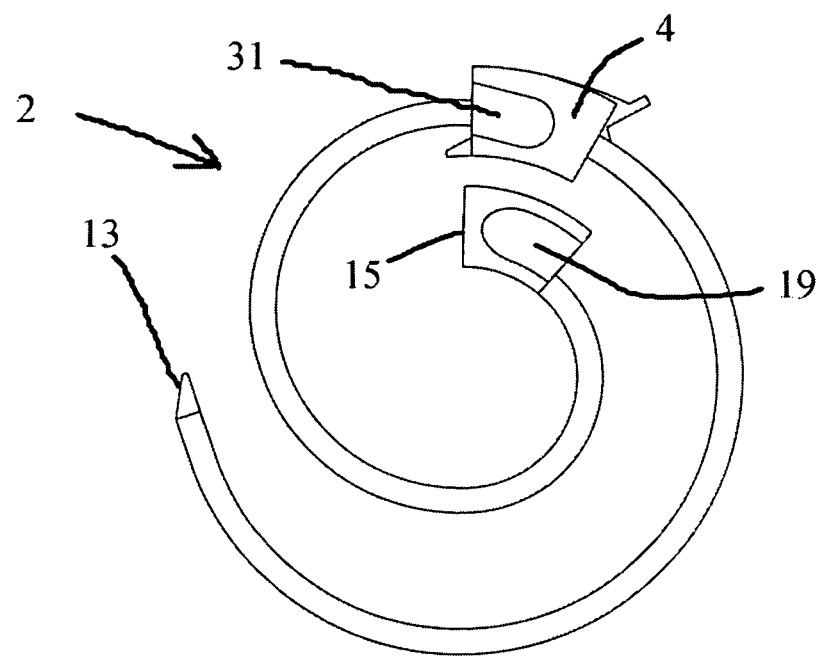
FIG. 5 is a side view of a band shown and/or described with reference to FIG. 2 further comprising a ratchet lock element shown and/or described with reference to FIG. 3A disposed on said band according to some embodiments of the disclosure.

FIG. 5 is a side view of a band 2 shown and/or described with reference to FIG. 2 further comprising a ratchet lock 4 shown and/or described with reference to FIG. 3A et al. disposed about band 2, the respective locations of first end 13 and second end 15 of band 2 being shown, as well as slots 19, 31. The perspective view of FIG. 6 also depicts the locations of these elements and features, also further shows the locations of ratchet bar 33 and ratchet tooth 27. In this embodiment, ratchet bar 33 is contoured to enable a user to use a finger, thumb or flat-bladed object to directly lift ratchet teeth 27 from outer surface features 7 of band 2 by a simple manual prying motion or action. That is, moving ratchet bar 33 upwards away from the outer surface 5 of band 2 disengages ratchet teeth 27 from band 2, enabling band 2 to move in or out of opening 25 of ratchet lock 4, i.e., ratchet lock 4 can be moved in either direction along band 2.

Figure 7:
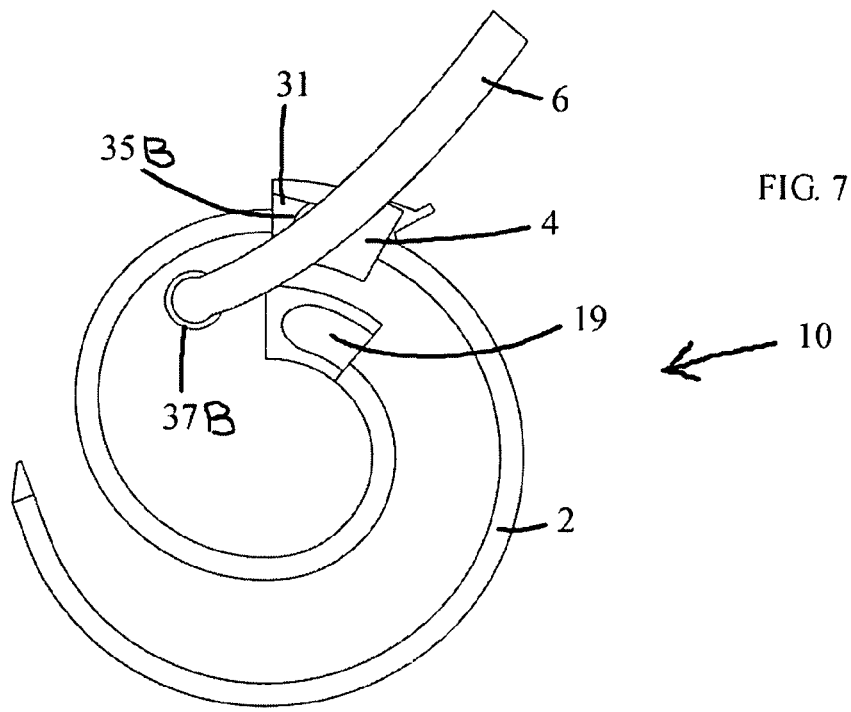
FIG. 7 is a side view of a band shown and/or described with reference to FIG. 5, further comprising a partially-engaged lever element shown and/or described with reference to FIG. 4A disposed on a band element according to some embodiments of the disclosure.
Figure 8:
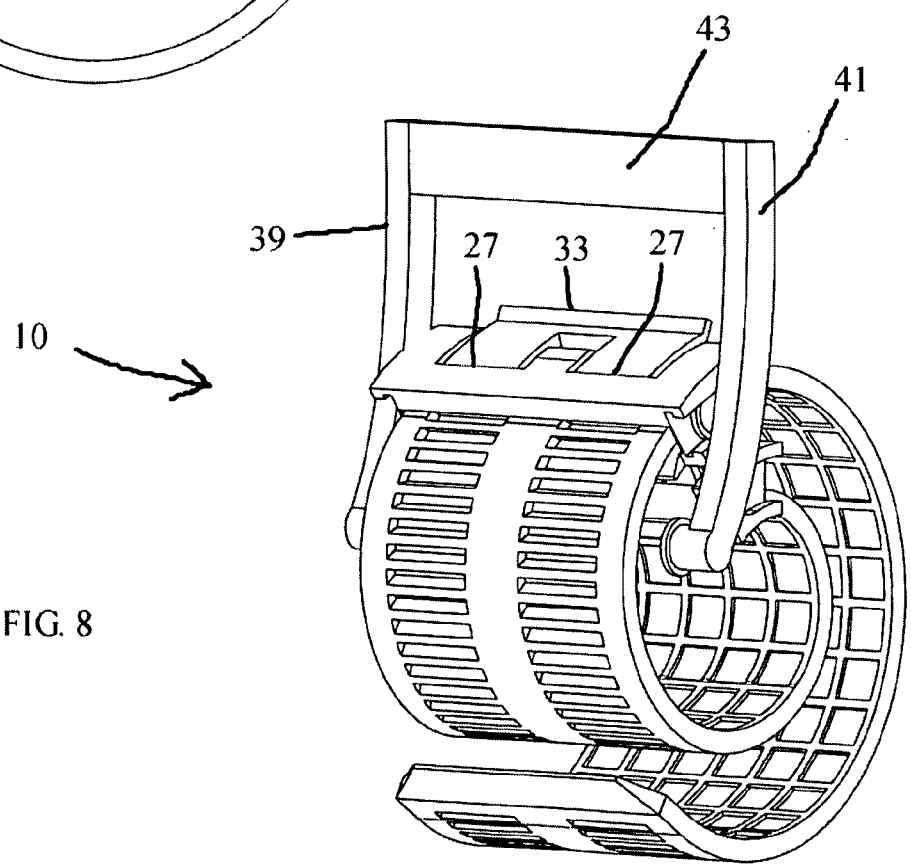
FIG. 8 is a perspective view of a band shown and/or described with reference to FIG. 7.
Figure 9:
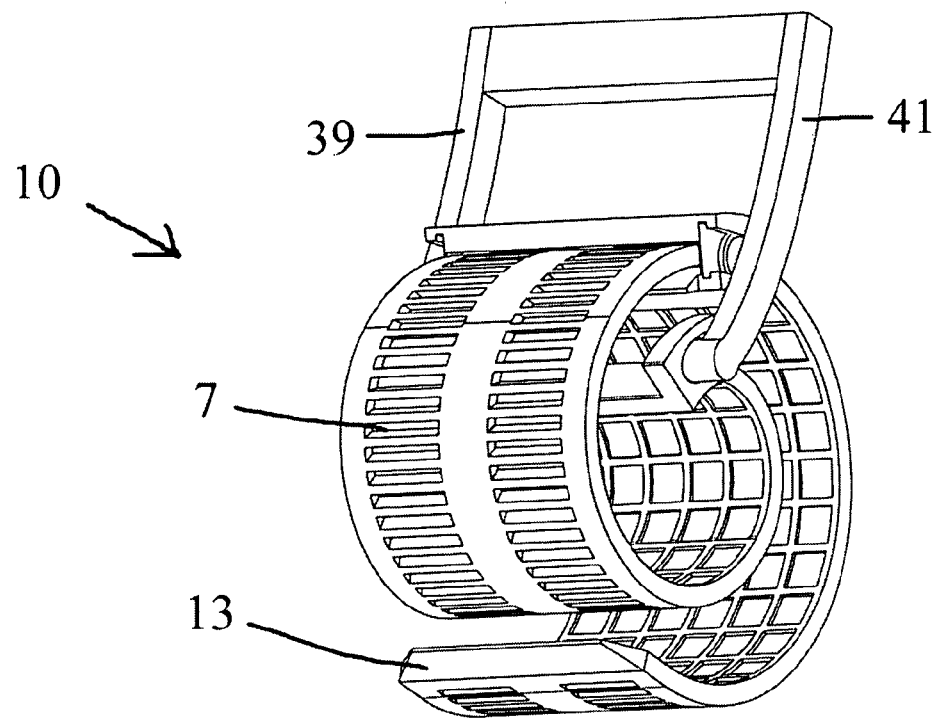
FIG. 9 is a perspective view of an article according to the disclosure band shown and/or described with reference to FIG. 8, wherein the lever is fully-engaged with the ratchet lock element and the second end of the band.

FIG. 7 is a side view of a band shown and/or described with reference to FIG. 5, further comprising lever 6 shown and/or described previously in a partially-engaged position. In this illustration, upper tang 35B is disposed within slot 31 of ratchet lock 4, the same arrangement being shown also in the perspective view of FIG. 8, which configuration is useful when a user is first attaching an article 10 according to this disclosure about the outer diameter of a leaking conduit. In some embodiments a user of an article 10 first places band 2 about the external wall of a conduit to which it is being applied, and then slides ratchet lock 4 along band 2 an appropriate amount to enable upper tangs 35A and 35B of lever 6 to engage within slots 31, 32 of ratchet lock 4, band 2 still remaining relatively loose. Alternately, tangs 35A and 35B may already be engaged within slots 31 and 32. Next, second end 15 of band 2 and lower tangs 37A and 37B of lever 6 are moved to sufficient proximity to one another to enable lower tangs 37A and 37B of lever 6 to engage within slots 19, 20 as shown in the perspective view of FIG. 9.

Figure 10:
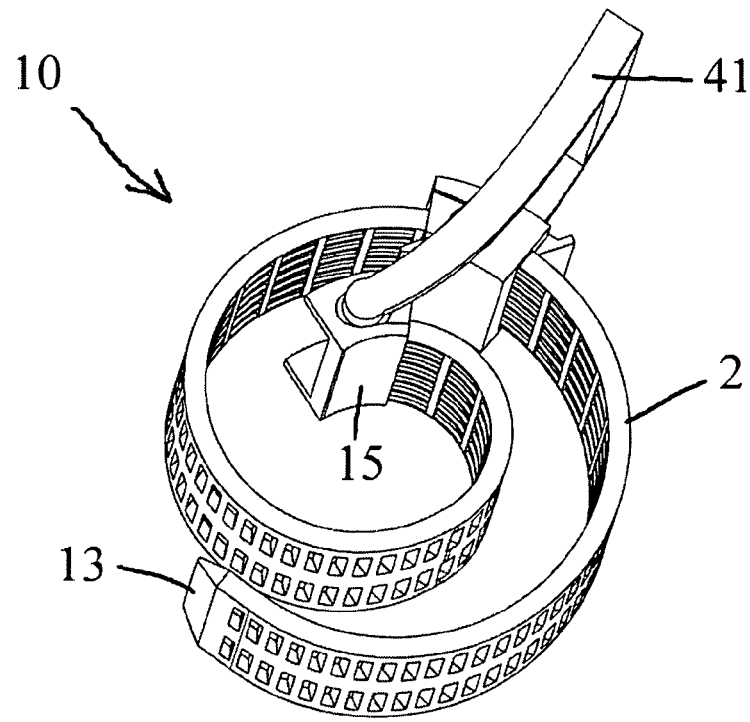
FIG. 10 is an alternate perspective view of a band shown and/or described with reference to FIG. 9.
Figure 11:
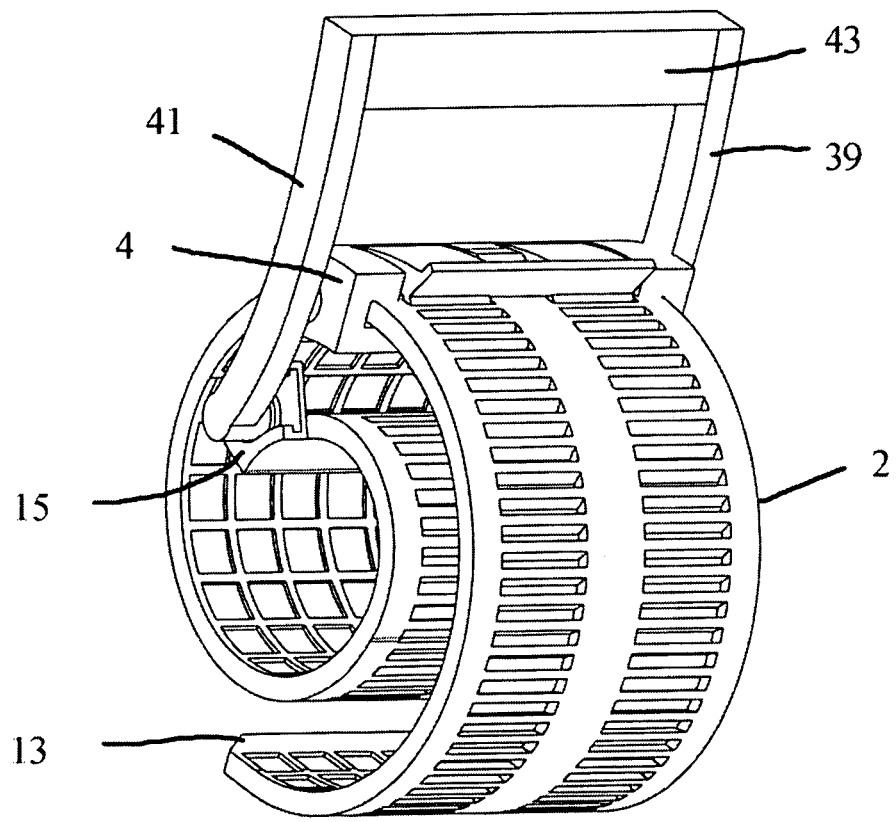
FIG. 11 is an alternate perspective view of a band shown and/or described with reference to FIG. 9.

Once band 2 is disposed about the external wall of a conduit to which it is applied, and upper tangs 35A and 35B are engaged in slots 31, 32 and lower tangs 37A and 37B are engaged in slots 19, 20, band 2 and lever 6 are grasped by the user, and band 2 is pulled on, so as to pull more of band 2 through opening 25 of ratchet lock 4, but only enough to make article 10 relatively taught about the conduit, but still loose enough to me moved along the conduit. Then, article 10 is slid so that band 2 is disposed over the imperfection, leak, failure or other breach point of the conduit, lever 6 is actuated in order to stop or substantially quell the material present within the conduit from leaking out further into the external surroundings. FIGS. 10 and 11 depict different viewing angles and perspectives of article 10 in its configuration shown in FIG. 9.

Figure 12:
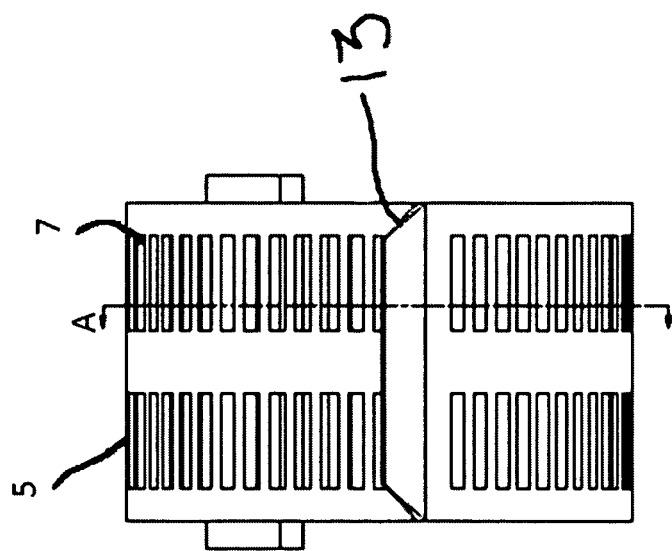
FIG. 12 is an end-on view of a band shown and described with reference to FIG. 2, having a cross-section taken at A, further shown and described with reference to FIGS. 13A, 13B, 14A, and 14B.

FIG. 12 is an end-on view of a band shown and described with reference to FIG. 2, having a cross-section taken at A, further shown and described with reference to FIGS. 13A, 13B, 14A, and 14B. In FIG. 12 are shown the respective locations of first end 13, outer surface 5, outer surface features 7, and section A.

Figure 13A:
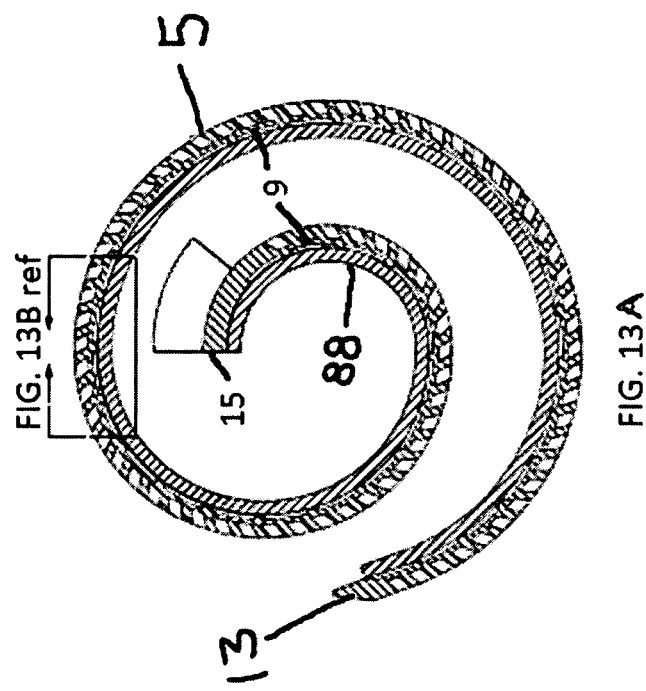
FIG. 13A is a side view of a band useful in accordance with some embodiments of the invention, taken through section A of FIG. 12, which identifies a sub-portion that is more closely depicted in FIG. 13B.
Figure 13B:
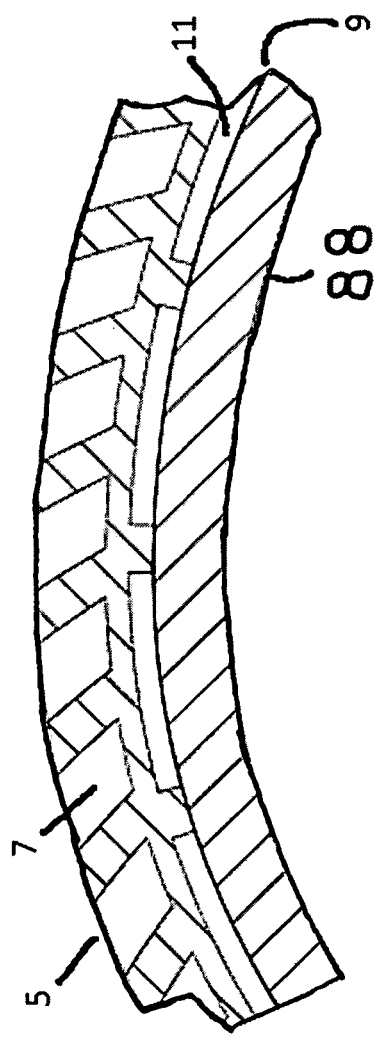
FIG. 13B is a side view of the sub-portion identified in FIG. 13A of a band useful in accordance with some embodiments of the disclosure.

FIG. 13A is a side view of a band useful in accordance with some embodiments of the invention, taken through section A of FIG. 12. Depicted are outer surface 5, first end 13, second end 15, inner surface 9, and gasket 88 present over substantially all of inner surface 9. FIG. 13A also identifies a sub-portion that is more closely depicted in FIG. 13B, the view of the sub-portion in FIG. 13B showing the respective locations of outer surface 5, outer surface features 7, inner surface 9, inner surface feature 11, and gasket 88.

Figure 14B:
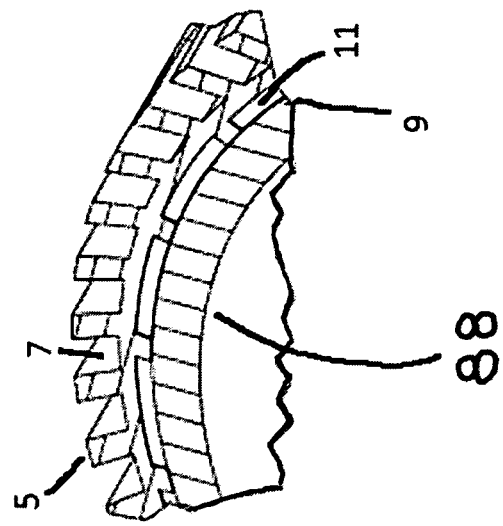
FIG. 14B is a sub-portion of a section of a band useful in accordance with some embodiments of the disclosure.
Figure 14A:
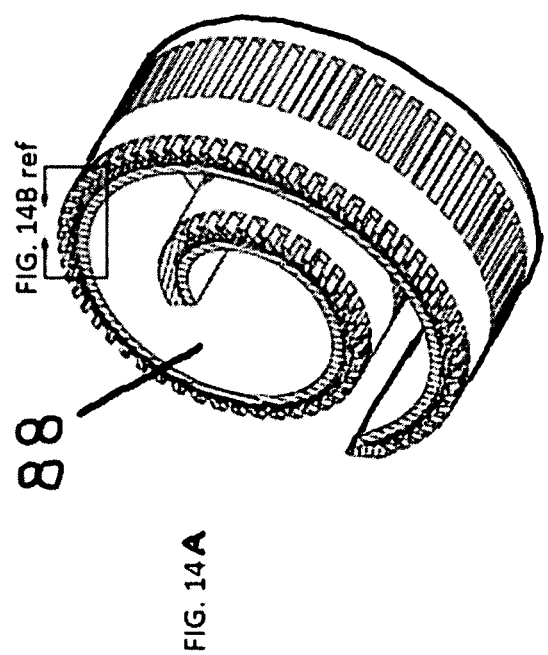
FIG. 14A is a perspective view of the section of a band shown in FIG. 13A, identifying a sub-portion thereof that is shown more closely in FIG. 14B.

In FIG. 14A is shown a perspective view of the section of a band shown in FIG. 13A, identifying a sub-portion thereof that is shown more closely in FIG. 14B wherein the respective locations of outer surface 5, outer surface features 7, inner surface 9, inner surface feature 11, and gasket 88

Although this invention has been described and disclosed in relation to certain exemplary embodiments, equivalent modifications and alterations thereof become apparent to persons of ordinary skill in this art after reading and understanding the teachings of this specification, drawings, and the claims appended hereto within the scope of the terms employed in this disclosure. The present invention includes subject matter defined by any combinations of any one or more of the features stated in this disclosure with any one or more of any other features stated in this disclosure. These combinations include the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claim(s) so modified. These combinations also include combination of the features and/or limitations of one or more of the independent claims with features and/or limitations of another independent claims to arrive at a modified independent claim, with the remaining dependent claims in their original text or as modified per the foregoing, being read and applied to any independent claim so modified. Materials of construction useful in providing an article as disclosed herein include any material that supports the structural needs of the design. The present invention has been disclosed and claimed with the intent to embrace modifications and alterations that achieve substantially the same result as herein taught using substantially the same or similar structures recognized as applicable hereto by those of ordinary skill in the art.

The invention claimed is:

1. An article useful for sealing leaks present on the walls of tubular conduits, comprising:
    a) a flexible band having a first end, a second end, a first surface,
    and a second surface,
wherein said first surface has a plurality of distinct depressions thereon and wherein said second end comprises a first plurality of elongate slots;
    b) a ratchet lock having an opening passing therethrough, said ratchet lock being configured to receive said first end of said band and to be disposed about said band, said ratchet lock further comprising a second plurality of elongate slots, and at least one ratchet tooth configured to engage with said distinct depressions on said first surface of said hand so as to permit movement of said hand within said opening in one direction only;
    c) a lever having:
        i) a first member;
        ii) a second member; and
        iii) a crossmember having two ends,
    said first and said second members each having a proximal end and a distal end, said first and said second members each being attached to a different end of said cross member at their proximal ends;
        iv) a pair of tangs disposed on each of said first member and said second member, one tang of each pair being more distally disposed with respect to said crossmember than the remaining tang of each pair, the remaining tangs of each pair being proximal tangs, wherein said ratchet lock is disposed about said band and wherein said distal tangs of each of said first and second members are engaged with said first plurality of elongate slots, and said proximal tangs of each of said first and second members are engaged with said second plurality of elongate slots.

2. An article according to claim 1 wherein said second surface comprises a gasket disposed along at least a portion of its length.

3. An article according to claim 1 wherein said plurality of distinct depressions are present as at least one single row disposed along the length of said band.

4. An article according to claim 1 wherein said plurality of distinct depressions are present as two rows disposed along the length of said band.

5. An article according to claim 1 wherein said first member and said second member of said lever are arcuate in shape as viewed from a side perspective.

6. An article according to claim 1 wherein said lever exists in a configuration selected from the group consisting of: U-shaped and horseshoe shaped as viewed from a frontal perspective.

7. An article according to claim 1 wherein said at least one ratchet tooth is attached to said ratchet lock sufficiently to be selectively manually releasable from a corresponding number of distinct depressions in said band with which said lock is engaged.

8. A method for substantially repairing a leak on a conduit, which comprises the steps of:
    a) providing a leaking conduit having a leak
    b) providing an article according to claim 1; and
    b) affixing said article to said conduit over the location of said leak, sufficiently to substantially stop the leak from leaking.

9. A repair kit useful for stopping leaks on conduits comprising the elements of
    a) a flexible hand as set forth in claim 1;
    b) a ratchet lock as set forth in claim 1;
    c) a lever as set forth in claim 1,
wherein each of said elements are present as distinct components in said kit, and wherein all of said elements are configured to engage with one another as set forth in claim 1.

* * * * *